United States Patent [19]

Mühlhahn et al.

[11] Patent Number: 4,660,811
[45] Date of Patent: Apr. 28, 1987

[54] SYNTHETIC-RESIN COMPRESSION SPRING

[75] Inventors: Dieter Mühlhahn, Langenfeld; Gino Marsella, Neuss; Friedhelm Detzner, Duisburg; Dieter Simons, Krefeld; Horst-Dieter Schäfer, Willich; Hermann Haarkötter, Krefeld, all of Fed. Rep. of Germany

[73] Assignee: Ringfeder GmbH, Krefeld, Fed. Rep. of Germany

[21] Appl. No.: 763,357

[22] Filed: Aug. 7, 1985

[30] Foreign Application Priority Data

Aug. 16, 1984 [DE] Fed. Rep. of Germany ....... 3430122

[51] Int. Cl.⁴ ............................................. F16F 3/08
[52] U.S. Cl. ................................. 267/141.1; 188/268; 267/139
[58] Field of Search .............. 188/268, 379; 267/63 R, 267/139, 140.3, 141.1, 141.3

[56] References Cited

U.S. PATENT DOCUMENTS

| | | | |
|---|---|---|---|
| 1,872,259 | 8/1932 | Eldridge | 267/140.3 |
| 3,448,949 | 6/1969 | Kelley | 267/140.3 |
| 4,504,044 | 3/1985 | Shtarkman | 267/140.3 X |

FOREIGN PATENT DOCUMENTS

| | | | |
|---|---|---|---|
| 683167 | 10/1935 | Fed. Rep. of Germany ... | 267/140.3 |
| 898053 | 4/1945 | France | 267/140.3 |
| 1423391 | 11/1965 | France | 267/141.3 |
| 885116 | 12/1961 | United Kingdom | 267/140.3 |

*Primary Examiner*—Duane A. Reger
*Attorney, Agent, or Firm*—Michael J. Striker

[57] ABSTRACT

A spring according to this invention has a core of an elastically deformable but substantially incompressible material and having two axially spaced end surfaces operatively engageable with objects to be relatively resiliently mounted. Thus when the two bodies engaging the end surfaces move toward each other the core swells radially. An annular belt formed of an elastic synthetic resin snugly surrounds the core between its ends. The belt can be lapped or can be a single unitary ring. It may also be formed of a plurality of independent layers having ends provided with a heat-shrunk clip for securing the ends together. To soften the initial spring characteristic the belt is corrugated and has peaks engaging the core and valleys normally not engaging the core. The corrugations may run longitudinally or transversely.

20 Claims, 21 Drawing Figures

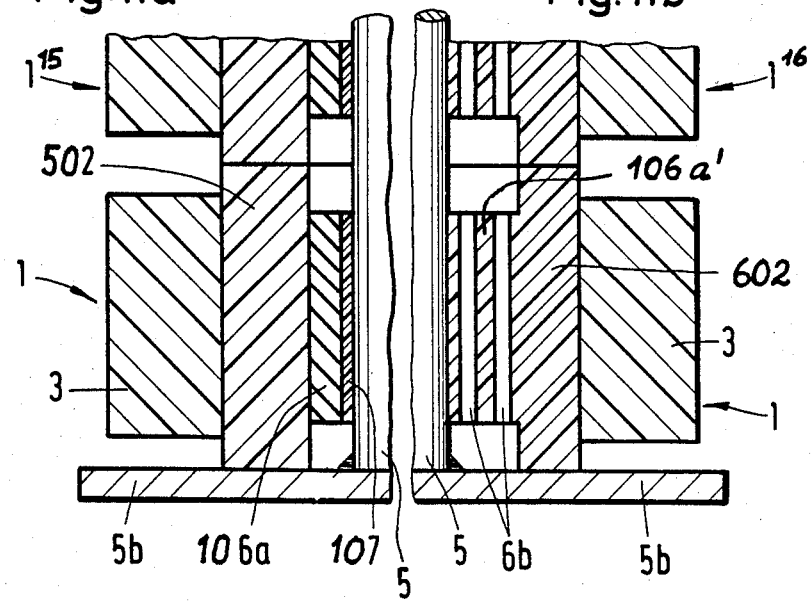
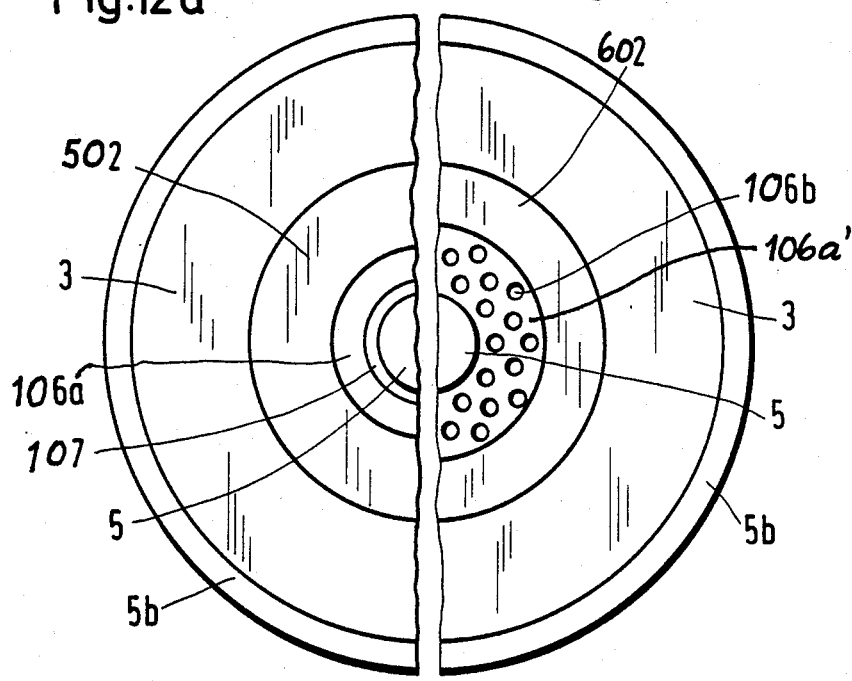

SYNTHETIC-RESIN COMPRESSION SPRING

FIELD OF THE INVENTION

The present invention relates to a spring made mainly of synthetic resins. More particularly this invention concerns such a spring usable in the bumpers of vehicles such as railroad cars.

BACKGROUND OF THE INVENTION

The bumper of a railroad car or the like must have at least one shock-absorbing spring engaged between the bumper and the vehicle body, so the two can move relatively without damage. Thus the spring allows the bumper to be pushed in, damping any sudden shock and transmitting it smoothly to the vehicle.

A typical such system is seen in U.S. Pat. No. 4,076,226 of C. Anolick where two relatively movable parts carry parallel spaced pins that are moved apart when the one part is pushed toward the other. A lapped belt of an oriented elastomer is looped over the two parts to absorb and cushion the shock when these parts are pushed together.

This arrangement is fairly bulky. In particular it is fairly long, occupying considerable space behind the vehicle body. Thus it is inappropriate for use in a railroad-car bumper, which necessitates a fairly stubby spring arrangement which must lie wholly outside the car.

OBJECTS OF THE INVENTION

It is therefore an object of the present invention to provide an improved spring.

Another object is the provision of such a spring which overcomes the above-given disadvantages, that is which employs synthetic resins so as to operate with little wear, and that also is very compact.

SUMMARY OF THE INVENTION

A spring according to this invention has a core of an elastically deformable but substantially incompressible material and having two axially spaced end surfaces operatively engageable with objects to be relatively resiliently mounted. Thus when the two bodies engaging the end surfaces move toward each other the core swells radially. An annular belt formed of an elastic synthetic resin snugly surrounds the core between its ends.

The belt is typically formed of an oriented copolymer such as polyester that is stretched, for instance by rolling, to three to four times its original length. The resulting elasticity, determined by Hook's law, is perfect for this application.

Such a spring can be extremely compact, capable of withstanding enormous compressive forces. In addition it is of such simple construction that it will have a very long service life and does not need to be protected from the elements. Servicing is virtually nonexistent, as there are no particularly wear-prone parts.

According to this invention the belt is lapped, that is formed of a single unitary band wrapped in a multiplicity of turns around the core and having an outer end fastened to itself. A clip can do this fastening. In addition the belt can be a single unitary ring. It may also be formed of a plurality of independent layers having ends provided with means such as a heat-shrunk clip for securing the ends together.

To soften the initial spring characteristic, that is the resistance to compression at the start of compression, the belt is corrugated and has peaks engaging the core and valleys normally not engaging the core. The corrugations may run longitudinally or transversely.

In accordance with another feature of the invention the belt has a radially outwardly directed surface engaging the belt in surface contact and having a formation axially linking the belt to the core. This formation can be a radially outwardly projecting ridge or a radially outwardly concave groove. Either way the belt is generally of complementary U-section. In any case the belt has an inner surface bonded either by thermal welding or an adhesive to the core.

The core according to this invention is axially longer than the belt so that its end surfaces project past the belt. It is also possible for the belt to have end surfaces having radially inner portions coterminous with the end surfaces of the core and radially outer portions tapering axially toward each other therefrom. Furthermore the belt has an inner edge at the core and the core has an outer edge and one of the edges is chamfered so that the core and belt can be fitted together with the chamfered edge fitting first.

According to a further feature of this invention the spring has a housing having an end wall engaging one of the end surfaces and a side wall annularly surrounding the belt and core. A radially compressible guide is provided between the belt and the side wall. This radially compressible guide can be integrally formed with the belt and is itself formed with axially throughgoing empty passages. Furthermore a low-friction guide sleeve may lie between the guide and the side wall. The guide can also be integral with and axially shorter than the belt.

The core of this invention can also be annular and formed with an axially throughgoing passage, in which case the spring has a housing having an end plate flatly axially engaging one of the end surfaces of the core and a post projecting axially through the passage of the core, and a radially compressible guide between the core and the post.

Of particular use as an automotive-vehicle bumper spring is an arrangement of a plurality of such springs axially operatively abutting one another and formed with an axially throughgoing passage. Such a spring has a post axially traversing the passages of the springs and rigid washers engaged axially between the cores. These washers have appropriately finished surfaces with low coefficients of friction and the end surfaces of the springs have collars axially abutting through the washers.

DESCRIPTION OF THE DRAWING

The above and other features and advantages will become more readily apparent from the following, it being understood that any feature described with reference to one embodiment of the invention can be used where possible with any other embodiment. In the accompanying drawing:

FIGS. 11a and 11b are partial longitudinal sections through fifteenth and sixteenth springs of this invention;

FIGS. 12a and 12b are top views of the springs when respectively in FIGS. 11a and 11b.

SPECIFIC DESCRIPTION

Figure 1:
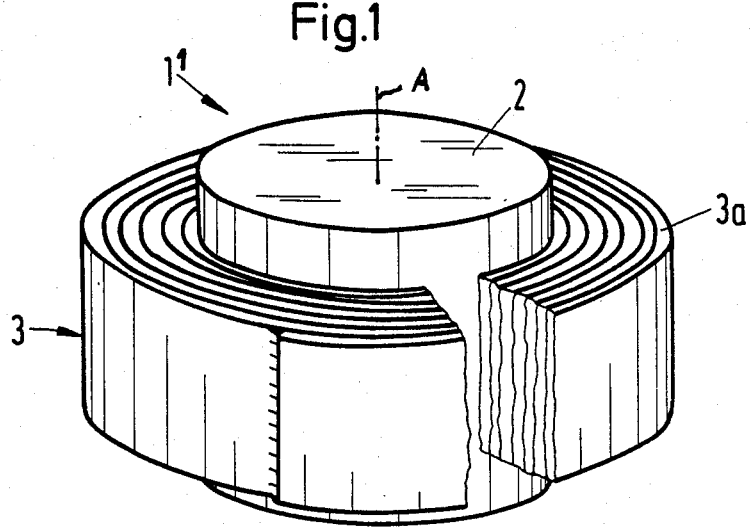
FIG. 1 is a perspective view of a first embodiment of a spring according to this invention.
Figures 2A, 2B:
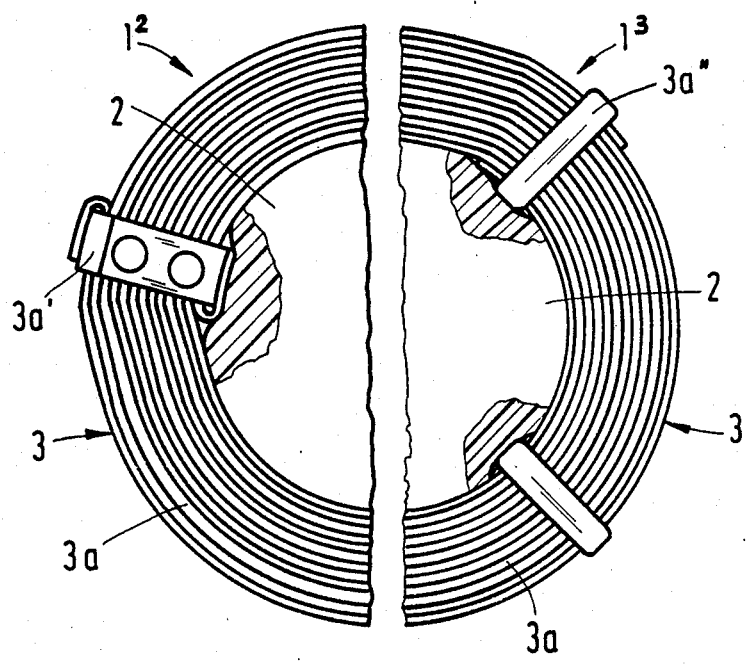
FIGS. 2a and 2b are partly sectional partial top views of second and third springs in accordance with this invention.

As seen in FIG. 1 a spring $1^1$ according to this invention has a cylindrical core 2 centered on an axis A and an annular belt 3 snugly surrounding it and of somewhat shorter axial length than the core 2. The core 2 is made of an elastically compressible synthetic resin, here polyurethane that is hydrostatic in that it changes shape but not volume when compressed. The belt 3 is made of a stretched or oriented resin such as an elastomeric polyester copolymer or an aromatic polyamide. Thus the radial expansion of the core 2 is converted into angular tension in the belt 3. In FIG. 1 the belt 3 is made of a strip 3a wound in eight layers around the core 2, with the outer strip end welded tight to the underlying layer. It is also possibles as shown in the spring $1^2$ of FIG. 2a to use a small crosswise tie belt 3a' that secures both the inner end and outer end of the belt 3a. In FIG. 2b the spring $1^3$ is tied up with shrink-fit belts 3a'' of an appropriate synthetic resin.

Figures 3A, 3B:
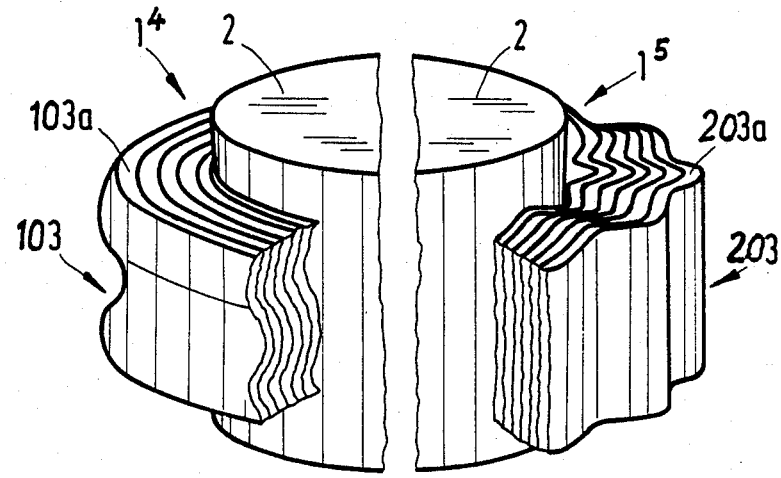
FIG. 3a and 3b are partial perspective views of fourth and fifth embodiments of the spring according to the invention.

The spring $1^4$ of FIG. 3a has a belt 103 formed of a strip 103a of S-section, and in FIG. 3b the spring $1^5$ has a belt 203 formed of a strip 203a with transverse corrugations. Both these systems have the advantage that the respective spring characteristics are very flat to start with, since the initial radial expansion of the core 2 serves to flatten out the belts 103a and 203a. Thus on initial deformation the springs $1^4$ and $1^5$ are much softer than the springs $1^1$-$1^3$.

Figures 4A, 4B:
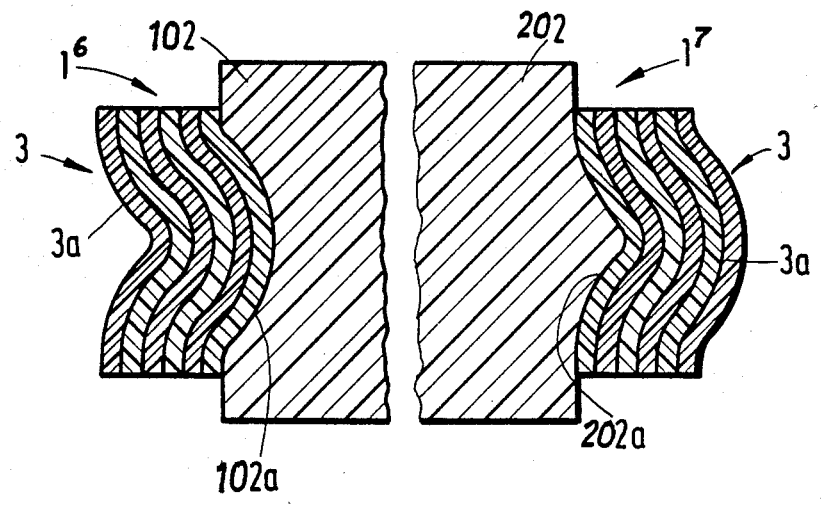
FIGS. 4a and 4b are partial longitudinal sections through sixth and seventh springs of this invention.

FIGS. 4a and 4b show springs $1^6$ and $1^7$ having cores 102 and 202 respectively formed with an outwardly opening peripheral groove 102a and an outwardly projecting peripheral ridge 202a. These formations 102a and 202a deform the otherwise flat strip 3a when it is wound tightly therearound, and prevent it from shifting axially on the cores 102 and 202.

Figure 5:
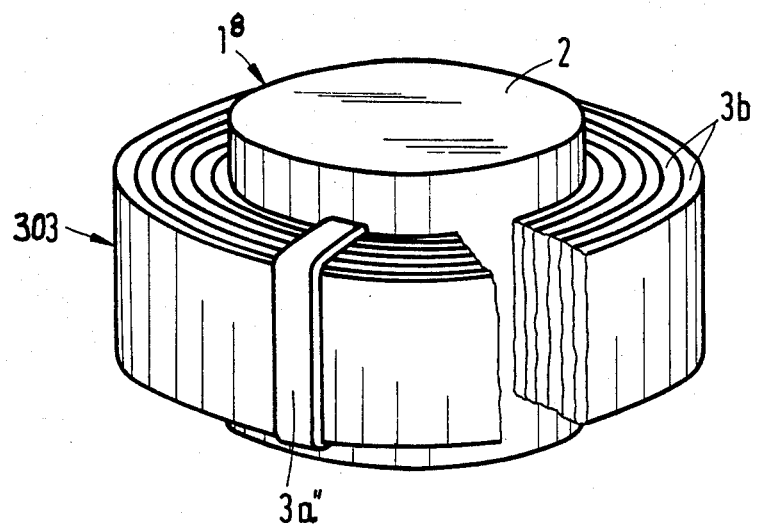
FIG. 5 is a partly cut away perspective view of an eighth spring.
Figure 6:
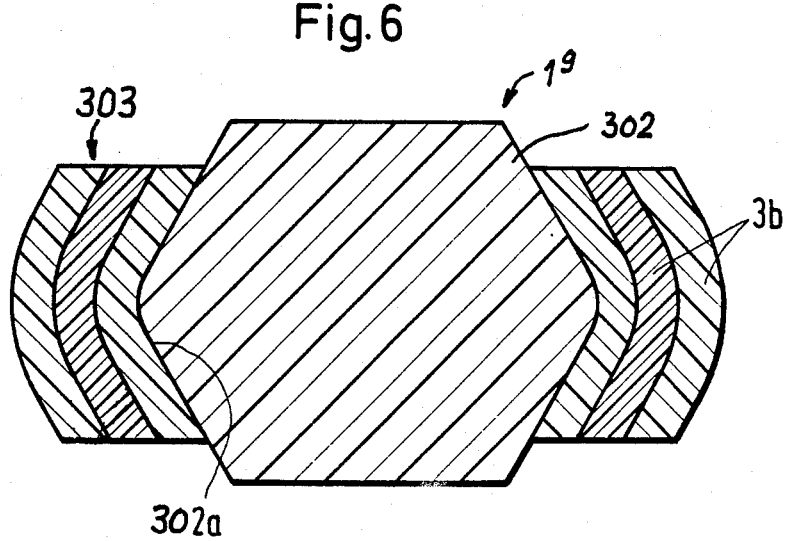
FIG. 6 is a longitudinal section through a ninth spring.

The spring $1^8$ of FIG. 5 has a belt 303 formed by a plurality of independent strips 3b whose ends are secured together by a heat-shrunk band 3a'''. In FIG. 6 the bands 3b surround a core 302 having an outwardly convex outer surface 302a that, like the cores of FIGS. 4a and 4b, helps to axially arrest the belt 303 on the core 302.

Figure 7:
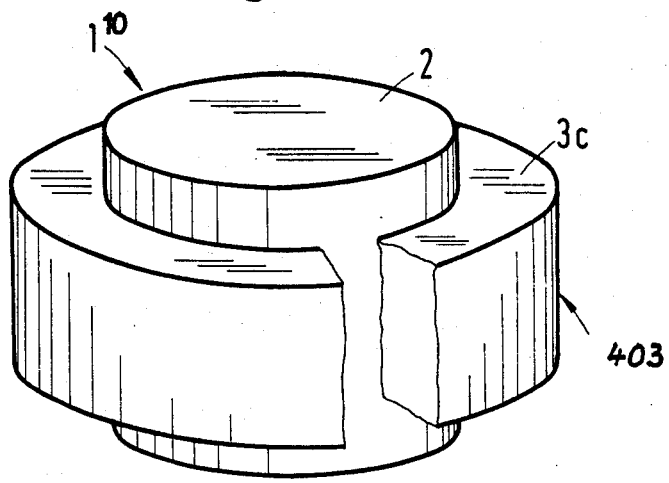
FIG. 7 is a partly cut away perspective view of a tenth spring.
Figure 8A:
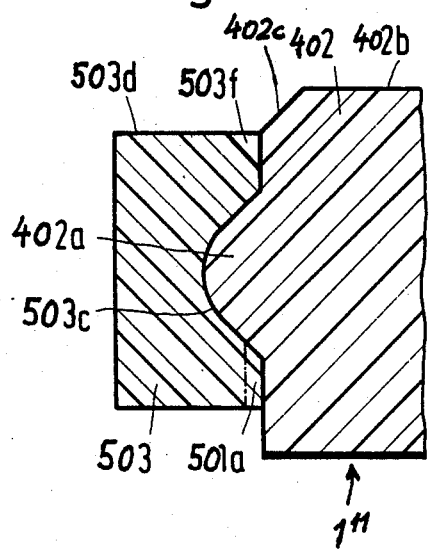
FIGS. 8a, 8b, 9a, and 9b are partial longitudinal sections through eleventh through fourteenth springs according to the invention.

In FIG. 7 a belt 403 of a spring $1^{10}$ is formed of a single unitary ring 3c of oriented and stretchable resin on a standard cylindrical core 2. As shown for the spring $1^{11}$ of FIG. 8a a core 402 can have one planar end surface 402b formed with a chamfered outer edge 402c and the one-piece belt 503 can have an end surface 503d formed at its inner edge with a chamfer 503f, facilitating assembly of the spring $1^{11}$. In addition the core 402 is formed with an outwardly directed ridge 402a received in a complementary groove 503c in the inner periphery of the ring 503. Furthermore the inside of the ring 503 can be cut away as indicated at 501a to give the spring $1^{11}$ a flat starting out characteristic as described above with reference to FIGS. 3a and 3b.

Figure 8B:
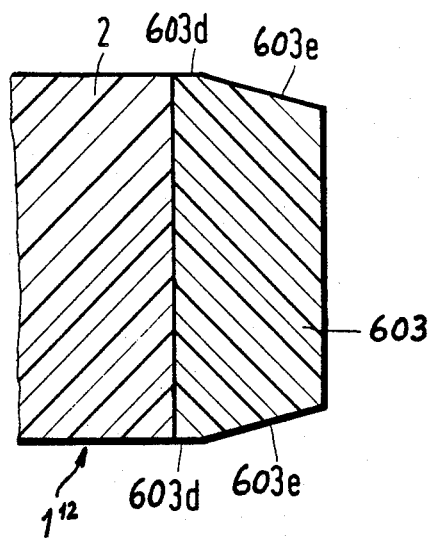

The spring $1^{12}$ of FIG. 8b has a standard cylindrical core 2 and a one-piece belt 603 having parallel annular end surfaces 603d that are coplanar with the respective end surfaces of the core 2 and beveled frustoconical end surfaces 603e that taper outward toward each other as seen in section. This belt 603 can be adhesively attached to the core 2, or can be of an inner diameter slightly smaller than the outer diameter of this core 2 so that a tight pressure fit can be made between the two.

Figures 9A, 9B:
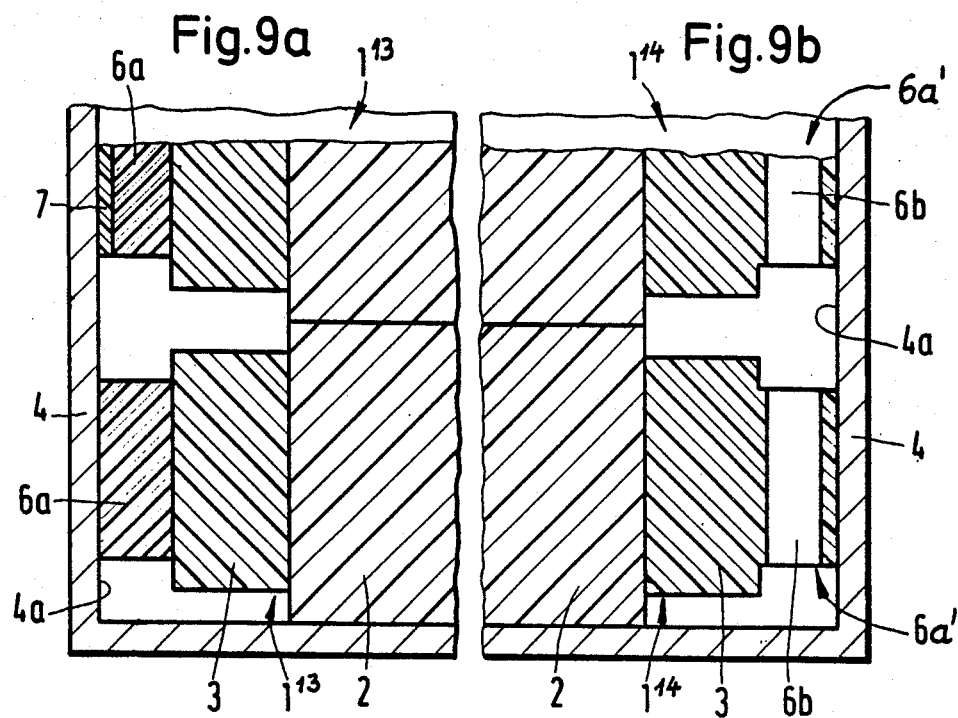
Figure 10A:
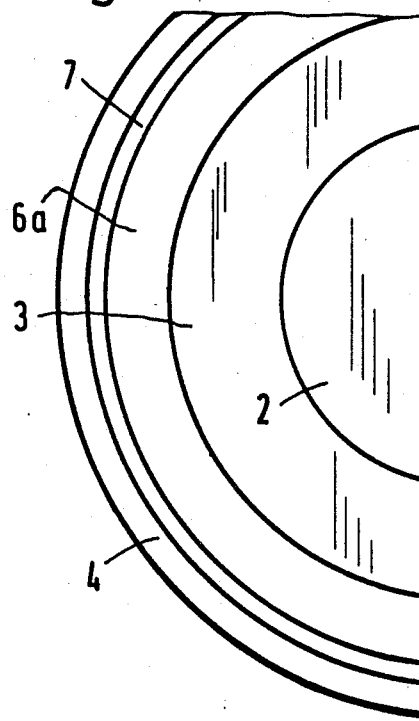
FIGS. 10a and 10b are top views of the springs shown respectively in FIGS. 9a and 9b.
Figure 10B:
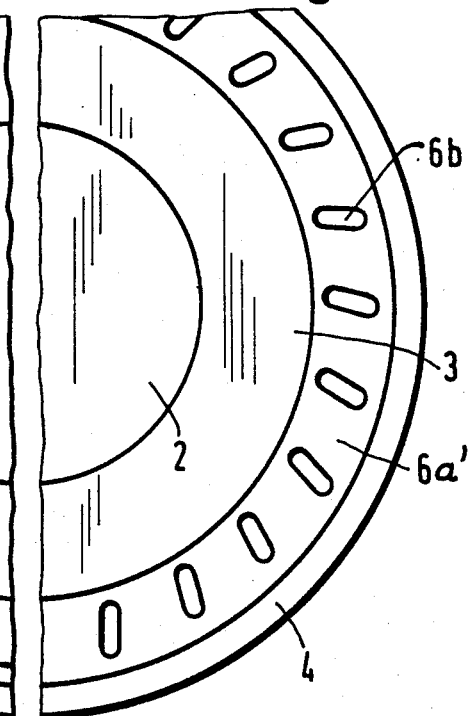

In FIGS. 9a and 10a a pair of springs $1^{13}$ are received in a tube 4 having a cylindrical inner surface 4a coaxial with the ring 3 and core 2. The lower spring $1^{13}$ is guided by a highly compressible low-friction ring 6a on the surface 4a, this ring 6a being axially shorter than the belt 3 to which it is fixed. The upper spring $1^{13}$ has another such ring 6a that is guided by a smaller slide ring 7 on the surface 4a. The springs $1^{14}$ of FIGS. 9b and 10b are received in a tubular housing 4 like that of FIG. 9a, but their belts 3 are integrally formed with guide projections 6a' which are axially shorter, than the belt 3 and which are formed with holes 6b allowing these guides 6a' to be compressed radially.

Similarly, in FIGS. 11a and 12a the springs $1^{15}$ have annular cores 502 provided internally with guide rings 106a provided internally with slide rings 107 riding on a central cylindrical guide post 5 projecting upward from a flat end plate 5b on which the end core 502 bears. The ring 106a is, like the ring 6a, highly compressible and the ring 107 has a very low coefficient of friction and is fixed to the ring 106a and is slidable on the post 5. in a manner similar to that of FIGS. 9b and 10b, the ring 602 of FIGS. 11b and 12b itself directly engages the post 5, but is made highly compressible by forming it with axially throughgoing passages 6b. Thus an initially soft spring characteristic is achieved while allowing some relative axial movement between the springs $1^{16}$ and the post 5.

Figure 13:
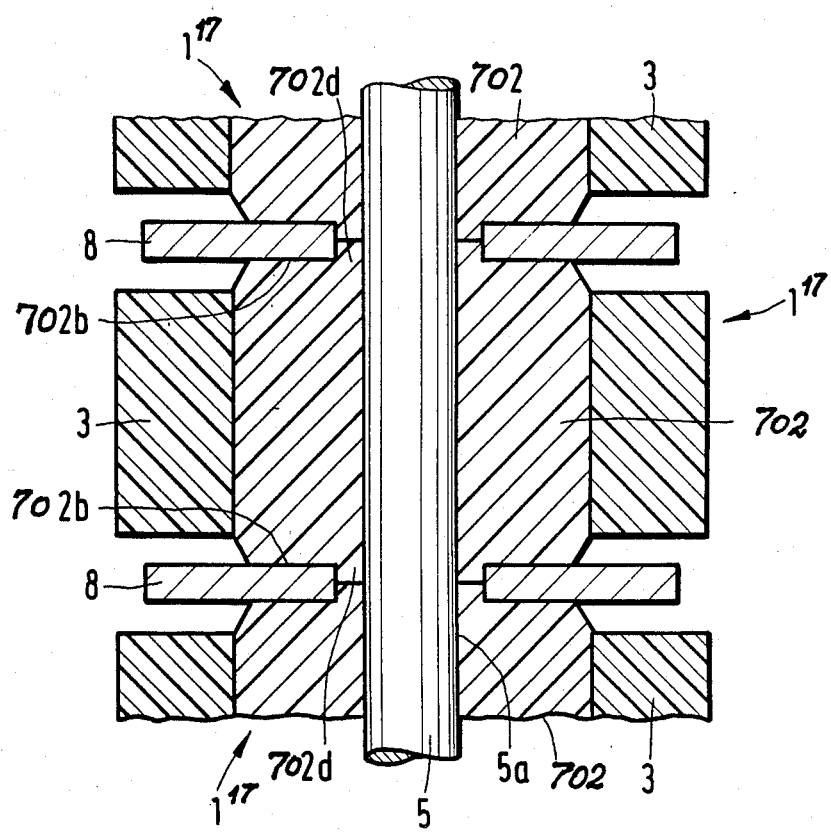
FIG. 13 is a longitudinal section through a seventeenth spring in accordance with the invention.

FIG. 13 shows three springs $1^{17}$ having annular cores 702 carried directly on the post 5 and separated by washers 8. The cores 702 have central axial projections 702d that engage each other directly through the washers 8 which therefore engage in insets 702b in these cores 702. Thus these washers 8, which are metallic, are held out of contact with the metallic post 5. The surfaces of these washers 8 are coated or otherwise finished to minimize friction.

We claim:

1. A compression spring comprising:
   - a core of an elastically deformable but substantially incompressible material and having two axially spaced end surfaces operatively engageable with objects to be relatively resiliently mounted, whereby when the two bodies engaging the end surfaces move toward each other the core swells radially; and
   - an annular belt snugly circumferentially surrounding the core between its end surfaces and formed of an elastic and circuferentially oriented synthetic resin, the end surfaces projecting mainly axially past the belt such that on radial swelling of the core the belt is tensioned substantially only circumferentially.

2. The spring defined in claim 1 wherein the belt is formed of a single unitary band wrapped in a multiplicity of turns around the core and having an outer end fastened to itself.

3. The spring defined in claim 1 wherein the belt is formed as a single unitary ring.

4. The spring defined in claim 1 wherein the belt is formed of a plurality of independent layers having ends and is provided with means for securing the ends together.

5. The spring defined in claim 2 wherein the belt is corrugated and has peaks engaging the core and valleys normally not engaging the core, whereby the initial spring characteristic of the spring is low.

6. The spring defined in claim 1 wherein the belt has a radially outwardly directed surface engaging the belt in surface contact and having a formation axially linking the belt to the core.

7. The spring defined in claim 6 wherein the formation is a radially outwardly projecting ridge and the belt is generally of complementary U-section.

8. The spring defined in claim 6 wherein the formation is a radially outwardly concave groove and the belt is generally of complementary U-section.

9. The spring defined in claim 1 wherein the belt has an inner surface bonded to the core.

10. The spring defined in claim 1 wherein the core is axially longer than the belt so that its end surfaces project past the belt.

11. The spring defined in claim 1 wherein the belt has end surfaces having radially inner portions coterminous with the end surfaces of the core and radially outer portions tapering toward each other therefrom.

12. The spring defined in claim 1 wherein the belt has an inner edge at the core and the core has an outer edge, one of the edges being chamfered, whereby the core and belt can be fitted together with the chamfered edge fitting first.

13. The spring defined in claim 1, further comprising:
a housing having an end wall engaging one of the end surfaces and a side wall annularly surrounding the belt and core; and
a radially compressible guide between the belt and the side wall.

14. The spring defined in claim 13 wherein the radially compressible guide is integrally formed with the belt and is itself formed with axially throughgoing empty passages.

15. The spring defined in claim 13, further comprising a low-friction guide sleeve between the guide and the side wall.

16. The spring defined in claim 13 wherein the guide is integral with and axially shorter than the belt.

17. The spring defined in claim 1 wherein the core is annular and formed with an axially throughgoing passage, the spring further comprising:
a housing having an end plate flatly axially engaging one of the end surfaces of the core and a post projecting axially through the passage of the core; and
a radially compressible guide between the core and the post.

18. The spring defined in claim 1 wherein a plurality of such springs axially operatively abut one another and are formed with an axially throughgoing passage, the spring further comprising:
a post axially traversing the passages of the springs; and
rigid washers engaged axially between the cores.

19. The spring defined in claim 18 wherein the washers have surfaces with low coefficients of friction and the end surfaces of the springs have collars axially abutting through the washers.

20. A compression spring comprising:
a core of an elastically deformable but substantially incompressible material and having two axially spaced end faces operatively engageable with objects to be relatively resiliently mounted and a radially outwardly directed outer surface, whereby when the two bodies engaging the end surfaces move toward each other the core swells radially;
an annular belt snugly surrounding the core between its end faces, having a radially inwardly directed inner surface radially engaging the outer surface of the core, and formed of an elastic synthetic resin; and
a radially projecting formation on one of the surfaces, the other surface being formed with a complementary radially open recess receiving the formation, whereby the interfitting projection and recess axially lock the core and belt together.

* * * * *